United States Patent
Nakamura

(10) Patent No.: US 6,253,003 B1
(45) Date of Patent: *Jun. 26, 2001

(54) OPTICAL COUPLING METHOD AND OPTICAL COUPLING DEVICE

(75) Inventor: Takahiro Nakamura, Tokyo (JP)

(73) Assignee: NEC Corporation, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/128,741

(22) Filed: Aug. 4, 1998

(30) Foreign Application Priority Data

Aug. 6, 1997 (JP) .................................. 9-211767

(51) Int. Cl.$^7$ ...................................... G02B 6/26
(52) U.S. Cl. ............................... 385/28; 385/43; 385/50
(58) Field of Search .......................... 385/280, 29, 43, 385/50

(56) References Cited

U.S. PATENT DOCUMENTS 5,261,017 * 11/1993 Melman et al. ..................... 385/28

FOREIGN PATENT DOCUMENTS

| | | |
|---|---|---|
| 6-174982 | 6/1994 | (JP) . |
| 7-74396 | 3/1995 | (JP) . |
| 8-37341 | 2/1996 | (JP) . |
| 8-125279 | 5/1996 | (JP) . |
| 8-171020 | 7/1996 | (JP) . |
| 8-330671 | 12/1996 | (JP) . |
| 10-90537 | 4/1998 | (JP) . |
| 10-332966 | 12/1998 | (JP) . |

OTHER PUBLICATIONS

Y. Itaya, et al., "Spot–size converted laser (SSC–LD)", Proceedings by the Institute of Electronics, Information and Communication Engineers, SC–2–1, 1996, pp. 431–432.

M. Kito et al., "Narrow beam divergence of 1.3 um MQW lasers with tapered active strips", First Optoelectronics and Communications Conference (OECC '96) Technical Digest, Jul. 1996, pp. 574–575.

Nakamura, et al., "High Efficiency 1/3 um Strained Multi-quantum Well Lasers Entirely Grown by MOVPE for Passive Optical Network Use" LEOS '96 Technical Digest, MA–2, 1996, pp. 8–9.

T. Yamamoto et al., "Low threshold current operation of 1.3 um narrow beam divergence tapered–thickness waveguide lasers", Electronics Letters, Jan. 2, 1997, vol. 33, No. 1, pp. 55–56.

Aoki, et al., "Wide–Temperature–Range Operation of 1.3–um Beam Expander–Integrated Laser Diodes Grown by In–Plane Thickness Control MOVPE Using a Silicon Shadow Mask", IEEE Photonics Technology Letters, vol. 8, No. 4, pp. 479–481, Apr. 1996.

Uda, et al., "Spot–size Expanded High Efficiency 1.3 um MQW Laser Diodes with Latterally Tapered Active Stripe", IPRM '97 Technical Digest, pp. 657–660 (1997).

* cited by examiner

Primary Examiner—Jon Henry
(74) Attorney, Agent, or Firm—McGinn & Gibb, PLLC

(57) ABSTRACT

For optically coupling two optical waveguide devices differing in a spot size of a light wave, an optical coupling device converts the light wave into a light wave of a desired spot size using the interference between the radiation mode and the guided mode which occurs in an optical waveguide. One of the two optical waveguide devices has a first optical waveguide and a second optical waveguide joined to the end of the first optical waveguide, wherein the width or thickness of the second waveguide different from the width or thickness of the first optical waveguide, and the length is set to the length at which a light wave of a desired spot size can be obtained.

20 Claims, 6 Drawing Sheets

A : A.Uda et al., IPRM'97 Technicl Digest, pp.657–560, 1997.
B : M.Kito et al., OECC'96 Technicl Digest, pp.574–575, 1996.
C : M.Aoki et al., IEEE Phton. Technol Lett., Vol.8,No.4,pp.479–481, 1996.
D : T.Yamamoto et al., Electron. Lett., Vol.33, No.1,pp.55–56, 1997.
E : Y.Itaya et al., PROCEEDINGS BY THE INSTITUTE OF ELECTRONICS, INFORMATION AND COMMUNICATION ENGINEERS, SC-2-1, 1996.
F : T.Nakamura et al., LEOS'96 Technical Digest, MA-2, 1996

OPTICAL COUPLING METHOD AND OPTICAL COUPLING DEVICE

BACKGROUND OF THE INVENTION

1. Field of the Invention

The present invention relates to an optical coupling method and an optical coupling device for optically coupling two optical waveguide devices differing in spot size of light wave.

2. Description of the Related Art

For example, when a semiconductor optical device such as a semiconductor laser diode and a semiconductor switch is optically coupled to an optical waveguide device such as a single mode optical fiber, even if an end of the semiconductor optical device is directly butted against and coupled to (butt-jointed to) an end of the optical fiber, a coupling loss is caused in the butting portion due to the difference in the spot sizes of the light waves of the optical waveguides.

Typically, the spot size (mode diameter) of a light wave emitted from a semiconductor optical device is about 1 $\mu$m, while the spot size of a single mode optical fiber is about 5 $\mu$m. When these devices are butt-jointed to each other, the coupling loss amounts to about 10 dB.

Heretofore, a method for reducing loss due to coupling a semiconductor optical device to an optical fiber has generally employed the use of a lens to cause the spot sizes to coincide with each other.

However, when the devices are optically coupled by the use of the lens or the like, assembly is difficult because tolerance is tight for aligning a lens, which disadvantageously raises the cost of the module including the lens. More particularly, recently the use of modules incorporating the semiconductor laser diode is rapidly spreading from basic transmission systems to subscriber systems, LAN (local area network) systems, data link systems and the like, and these systems require a large number of inexpensive modules.

As described above, since difficulty in the assembly process is the main cause of the high cost of a module incorporating the semiconductor laser diode, it is desirable that the assembly process be facilitated by reducing the number of components and by passive alignment. Thus, various optical coupling devices for optical coupling and a laser light source on which the optical coupling device and the semiconductor laser diode are integrated have been developed.

FIG. 1 shows an example of a laser light source on which a conventional optical coupling device and a semiconductor laser diode are integrated and the relationship of the coupling loss to the device length. The optical coupling devices introduced in cited references A–F shown in FIG. 1 are each provided with a tapered waveguide of hundreds of $\mu$m in length for converting the spot size. For converting from one guided mode to another guided mode, these devices are adapted so that the width of the waveguide is gradually narrowed (tapered). so as to thereby reduce coupling loss.

As shown in FIGS. 2 and 3, the conventional optical coupling device comprises: substrate 13; first waveguide 11 which is a wide straight waveguide buried in substrate 13; and second waveguide 12 in which the end in contact with first waveguide 11 is the same width as first waveguide 11 and that width is gradually narrowed toward the other end of minimum width. In these drawings, L denotes the length of second waveguide 12, W1 denotes the width of the widest portion, W2 denotes the width of the narrowest portion, n1 denotes the refractive index of substrate 13, and nc (>n1) denotes the refractive index of first waveguide 11 and second waveguide 12.

The above-described conventional optical coupling device has a problem in that an attempt to reduce the cost by shortening the device length increases the coupling loss as shown in FIG. 1.

In some laser light sources on which the optical coupling device and the semiconductor laser diode are integrated, an optical coupling portion is also used as an active layer (for example, M. Kito et al., OECC '96 Technical Digest, PP. 574–575, 1996). In this case, the longer the tapered waveguide is at the same device length, the more the gain of the semiconductor laser diode is reduced. This caises a problem in that the threshold current or operating current of a laser diode in a high-temperature environment is increased.

That is, in order to reduce the cost of the module and prevent the operating current from increasing, it is necessary to shorten the above mentioned optical coupling device and to reduce the coupling loss.

SUMMARY OF THE INVENTION

It is therefore an object of the present invention to provide an optical coupling device which has less coupling loss and an optical coupling method which reduces the cost of a module by shortening the device length.

In order to achieve the above object of optically coupling two optical waveguide devices differing in the spot size of light wave, the optical coupling device converts the light wave into a light wave of a desired spot size using the interference between the radiation mode and the guided mode which occurs in the optical waveguide. One of two optical waveguide devices has a first optical waveguide and a second optical waveguide, the end of which is joined to the end of the first optical waveguide, whose width or thickness is different from the width or thickness of the first optical waveguide, and the length is set to the length at which a light wave of the desired spot size can be obtained.

In the optical coupling device as described above, the radiation mode and the guided mode are allowed to interfere with each other in the optical waveguide, whereby the field distribution in the radiation mode is varied depending on the position of the optical waveguide. The length of the optical waveguide can be appropriately selected to obtain the desired spot size. Moreover, even if the selected length of the optical waveguide is short, coupling loss can be reduced compared with the prior art.

The above and other objects, features, and advantages of the present invention will become apparent from the following description with references to the accompanying drawings which illustrate preferred embodiments of the present invention.

BRIEF DESCRIPTION OF THE DRAWINGS

For a more complete understanding of the present invention and the advantages thereof, reference is now made to the following description taken in conjunction with the accompanying drawings, in which.

DETAILED DESCRIPTION OF THE PREFERRED EMBODIMENTS

Figure 1:
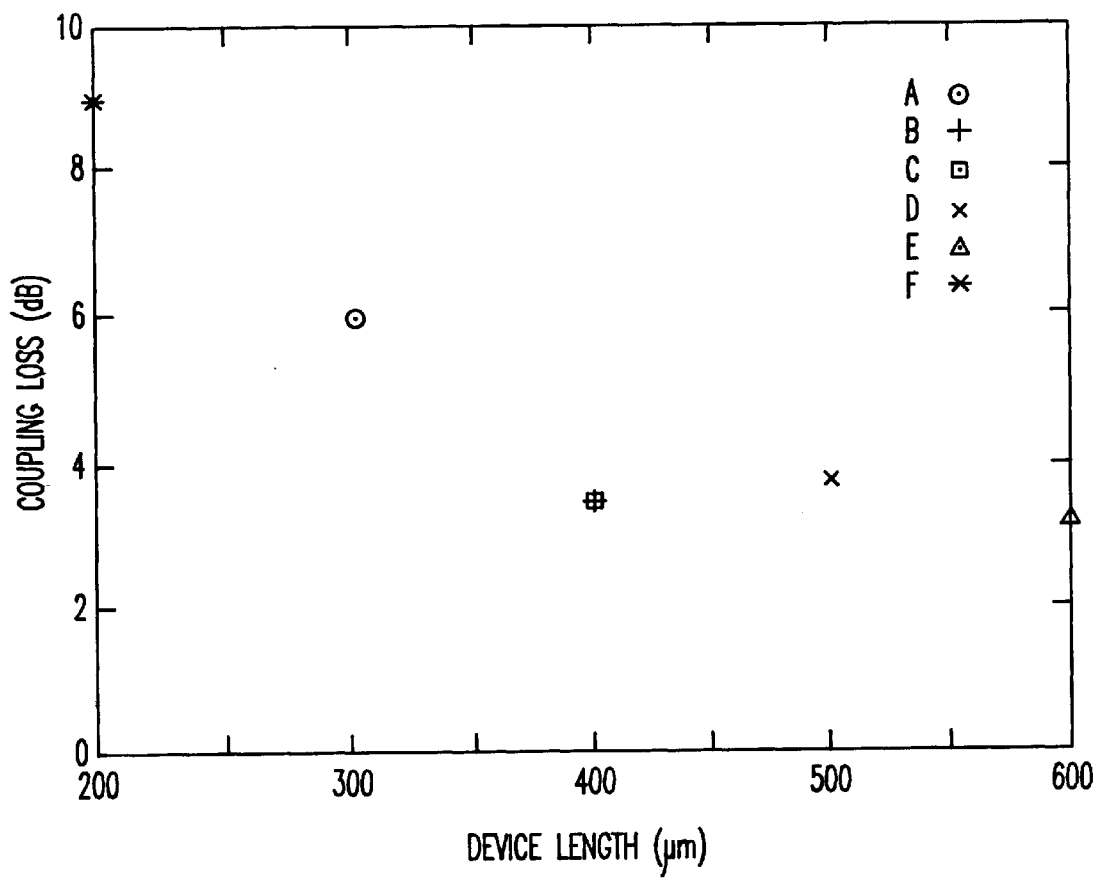
FIG. 1 shows an example of a laser light source on which a conventional optical coupling device and a semiconductor laser diode are integrated and the relationship of coupling loss to device length.
Figure 2:
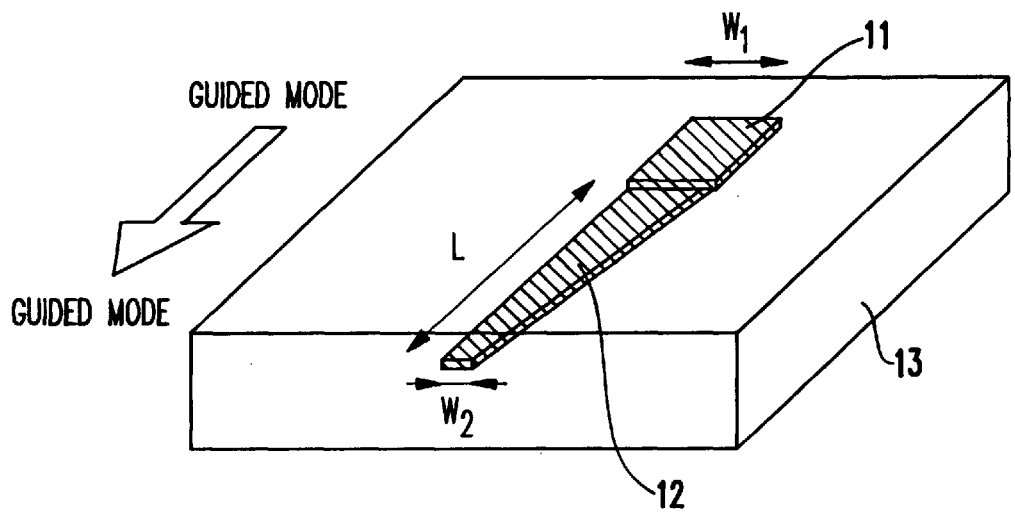
FIG. 2 is a perspective view showing a structure of a conventional optical coupling device.
Figure 3:
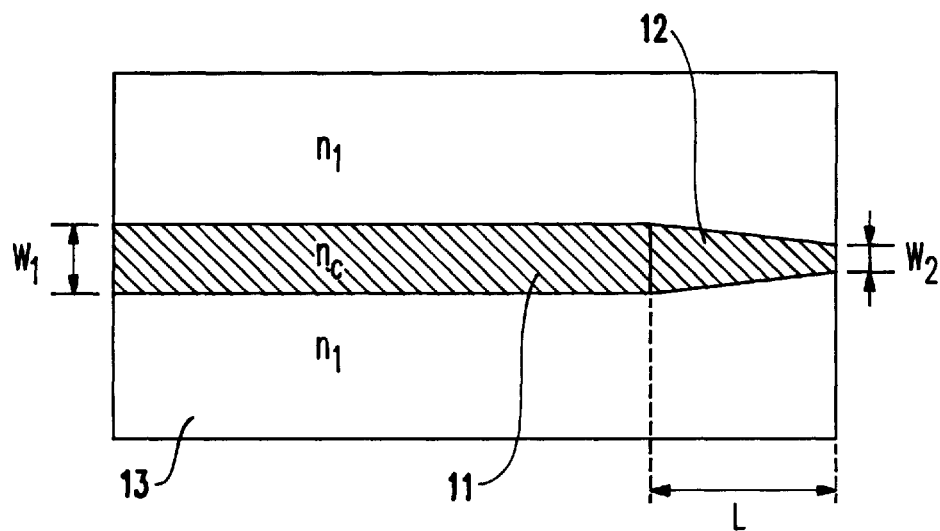
FIG. 3 is a plan view of the optical coupling device shown in FIG. 2 seen from the top surface thereof.

In the conventional optical coupling device shown in FIG. 2 only conversion from one guided mode to another guided mode is considered. Since it is necessary to taper the waveguide to reduce coupling loss, device length is increased.

Figure 4:
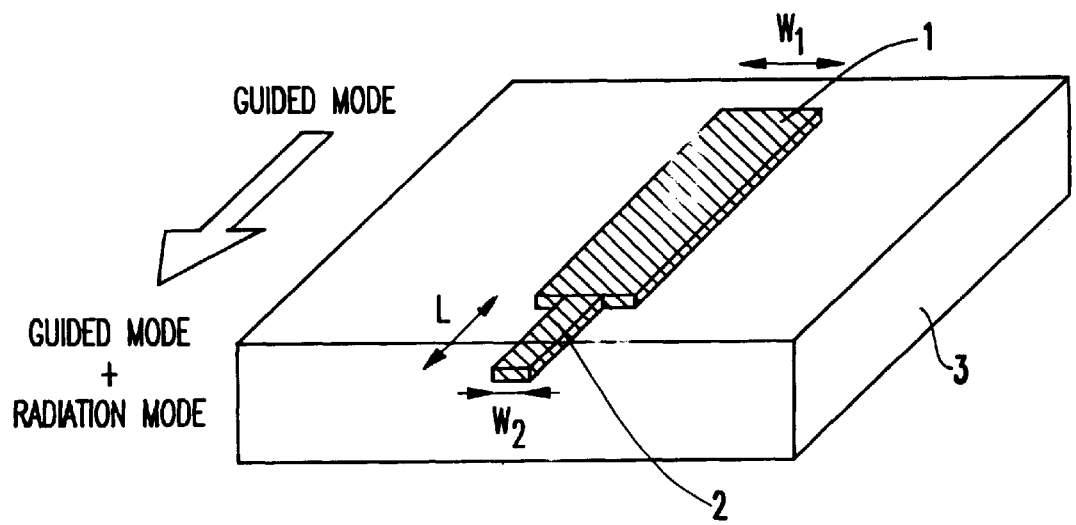
FIG. 4 is a perspective view showing an exemplary structure of the optical coupling device of the present invention.
Figure 5:
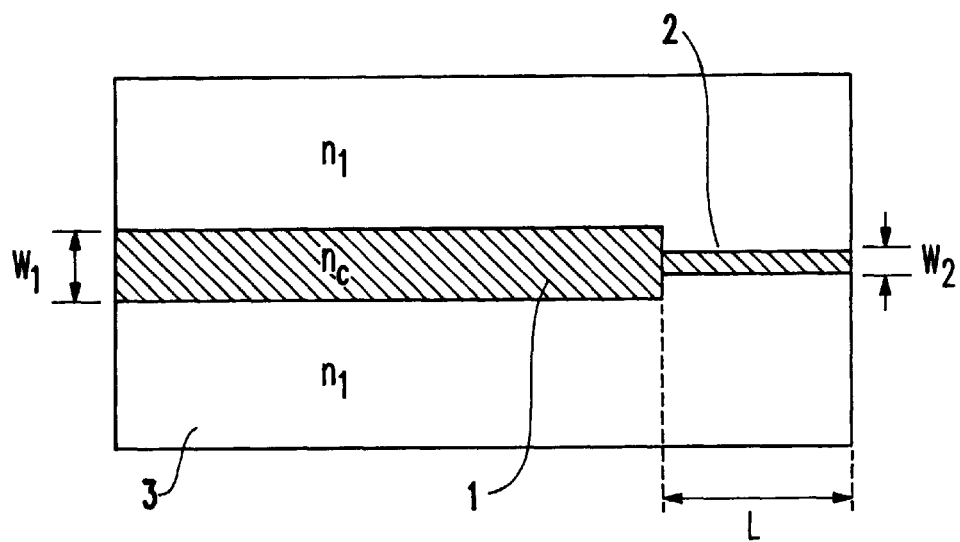
FIG. 5 is a plan view of the optical coupling device shown in FIG. 4 as seen from the top surface thereof.

As shown in FIGS. 4 and 5, the optical coupling device of an embodiment of the present invention comprises substrate 3, first waveguide 1 which is a wide straight waveguide buried in substrate 3, and second waveguide 2 which is a narrow straight waveguide, wherein the ends of first waveguides 1 and second waveguides 2, which differ in width, are coupled to each other.

Here $n1$ denotes the refractive index of substrate 3, $nc$ ($>n1$) denotes the refractive index of first waveguide 1 and second waveguide 2, $W1$ denotes the width of first waveguide 1, $W2$ ($<W1$) denotes the width of second waveguide 2 and L denotes the length of second waveguide 2. Further first waveguide 1 and second waveguide 2 are designed to propagate only in their fundamental modes.

With such a constitution, a light wave in the guided mode propagating through first waveguide 1, the wide straight waveguide, is coupled to the guided mode and radiation mode of second waveguide 2, the narrow straight waveguide, at the coupling portion of first waveguide 1 and second waveguide 2. At this time, the radiation mode also propagates along second waveguide 2, and thus the guided mode and the radiation mode interfere with each other in second waveguide 2.

Figure 6:
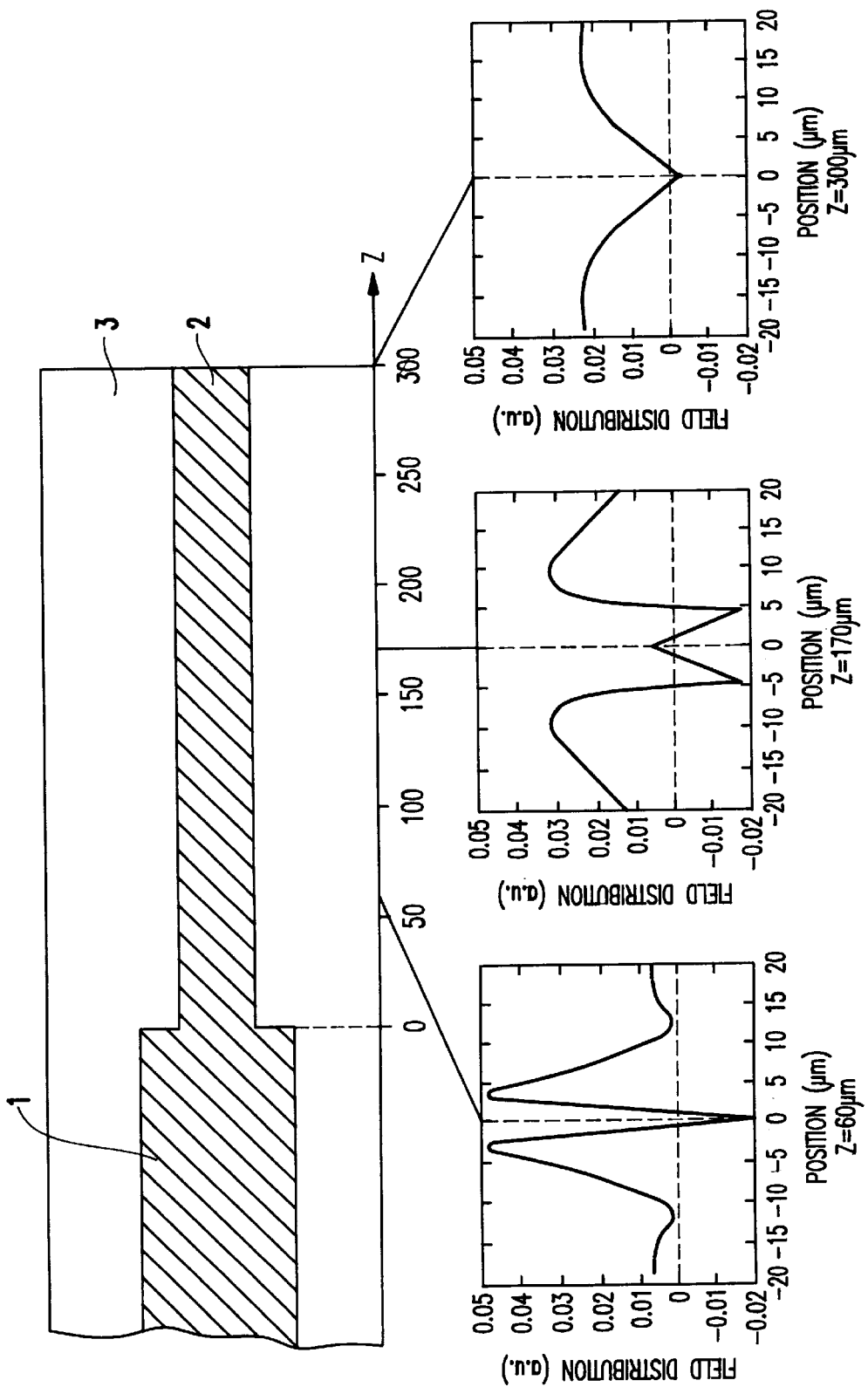
FIG. 6 shows interference in the second waveguide and a graph showing the field distribution in the radiation mode along the second waveguide.

The radiation mode in the second waveguide is shown in FIG. 6. As shown in FIG. 6, the shape of the radiation mode has shoulders around both peripheral side positions from centers at $Z=60$ $\mu$m and $Z=300$ $\mu$m. In this state, a spot size becomes larger, from the guided mode and the radiation mode interfering with each other. On the other hand, the shape of the radiation mode has shoulders directed opposite to the former shoulders around both peripheral side positions from the center at $Z=170$ $\mu$m. Thus, the spot size becomes smaller from the guided mode and the radiation mode interfering with each other.

In the optical coupling device of the present invention, this interference of the guided mode and the radiation mode is used to set the length of second waveguide 2 to obtain a desired spot size. In such a manner, an optimum spot size can be formed.

Next, the effect of the optical coupling device of the present invention will be described below.

Figure 7:
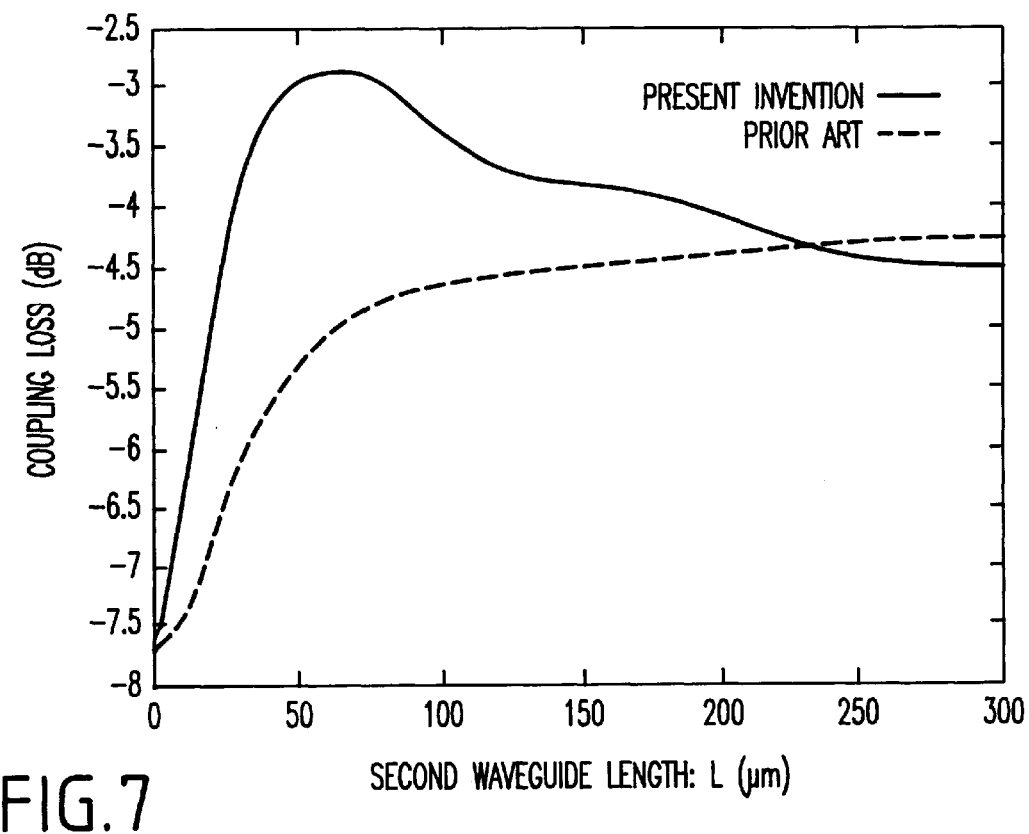
FIG. 7 is a graph showing the relationship of the coupling loss to the length of second waveguide of optical coupling devices of the present invention and the prior art.

The graph of FIG. 7 shows the relationship of the coupling loss to second waveguide length L when a single mode optical fiber of 5.0 $\mu$m radius is butt-jointed to the optical coupling device of the present invention and the conventional optical coupling device respectively. FIG. 7 shows the simulation result on the assumption that the waveguide is composed of InP/InGaAsP, the wavelength of a guided light is taken as 1.3 $\mu$m, $n1=3.21$, $nc=3.34$, $W1=1.2$ $\mu$m and $W2=0.6$ $\mu$m.

As shown in FIG. 7, the optical coupling device of the present invention obtains the minimum coupling loss of $-2.8$ dB when $L=60$ $\mu$m. On the other hand, in the conventional optical coupling device, the longer the length of the tapered waveguide is, the less the coupling loss is. However, the value of the coupling loss is not lower than $-4.2$ dB.

It is therefore understood that the coupling loss is improved by the shorter device length than the conventional device length by the use of the optical coupling device of the present invention (for example, when $L=60$ $\mu$m, the improvement of about 2 dB as compared with the prior art).

Figure 8:
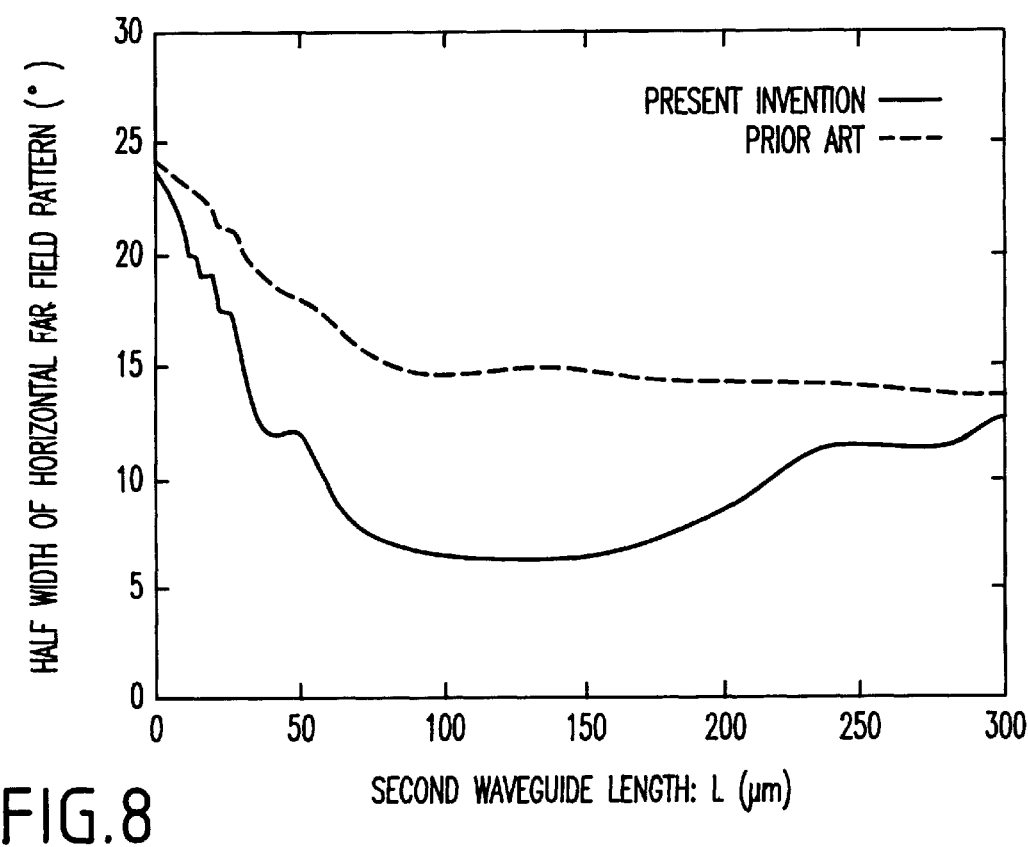
FIG. 8 is a graph showing the relationship of the half width of a horizontal far field pattern to the length of the second waveguide of optical coupling devices of the present invention and the prior art.
Figure 9:
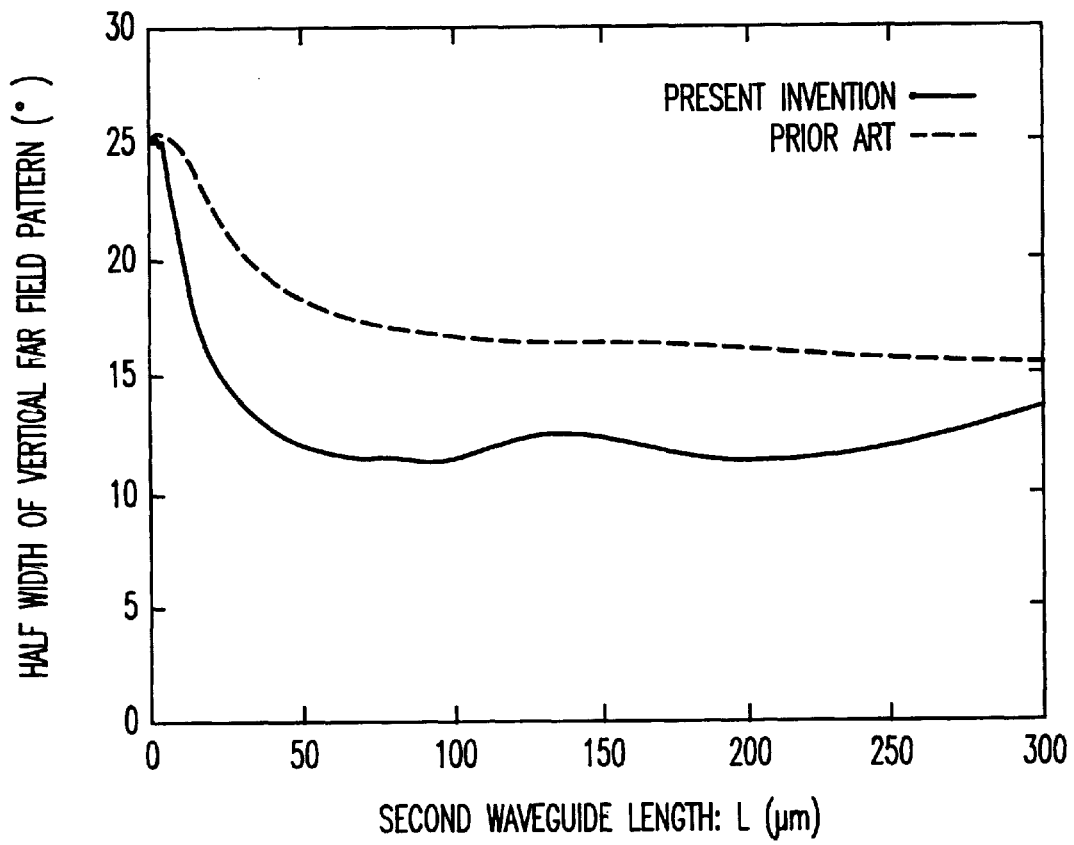
FIG. 9 is a graph showing the relationship of the half width of a vertical far field pattern to the length of the second waveguide of optical coupling devices of the present invention and the prior art.

Next, FIGS. 8 and 9 show the simulation result of the relationship between the half width of horizontal/vertical far field patterns and second waveguide length L in the optical coupling devices of the prior art and the present invention, where the half width of the far field pattern is an index of tolerance upon coupling the optical coupling device to a single mode optical fiber.

The half width of the far field pattern shows the spread of the beam emitted and the angle at which the far field strength is reduced to ½. The coupling loss and the half width of the far field pattern are determined by the shape of the waveguide at the emission opening.

It should be noted that the parameters used in the simulation have the same values as the parameters used in the coupling loss simulation shown in FIG. 7.

As shown in FIG. 8, the half width of the horizontal far field pattern is reduced from 14° of the prior art to 7°, an improvement to about ½ of the half width of the prior art. Additionally, as shown in FIG. 9, the half width of the vertical far field pattern is reduced from 16° of the prior art to 12°, an improvement about ¾ of the half width of the prior art.

Accordingly, by coupling the ends of first waveguides 1 and second waveguides 2 which differ in width, it is possible to obtain an optical coupling device having a short device length, less coupling loss and a narrower half width of the far field pattern.

Although a buried straight waveguide composed of InP/InGaAsP is described above as an example in this embodiment, the present invention is applicable to other-shaped waveguides such as a ridge waveguide. In addition, the present invention can be also applied to a waveguide composed of MQW (multiple quantum well) or the like and the waveguide composed of other semiconductor such as GaAs and a material other than the semiconductor, for example, a ferroelectric material such as $LiNbO_3$, a glass material such as $SiO_2$ or an organic material.

Furthermore, the present invention can be applied to a laser light source on which the optical coupling device and the semiconductor laser diode are integrated and the wholly active layer type semiconductor laser diode integrated by forming the waveguide itself of the optical coupling device as an active layer.

Although the preferred embodiment of the present invention has been described in detail, it should be understood that various changes, substitutions and alternations can be made therein without departing from spirit and scope of the inventions as defined by the appended claims.

What is claimed is:

1. An optical coupling device for optically coupling two optical waveguide devices differing in spot size of a light wave, comprising:
   a first optical waveguide into which a light wave is inputted from one of said two optical waveguide devices; and
   a second optical waveguide whose end is joined to the end of said first optical waveguide, whose width is different from the width of said first optical waveguide at said joined end, and the length of which is selectively set to a length at which a light wave of a desired spot size can be obtained from interference between a radiation mode and a guided mode which occurs in said optical waveguide, such that a minimum coupling loss result of said device is obtained.

2. An optical coupling device for optically coupling two optical waveguide devices differing in spot size of a light wave, comprising:
   a first optical waveguide into which a light wave is inputted from one of said two optical waveguide devices; and
   a second optical waveguide whose end is joined to the end of said first optical waveguide, whose thickness is different from the thickness of said first optical waveguide at said joined end, and the length of which is selectively set to a length at which a light wave of a desired spot size can be obtained from interference between a radiation mode and a guided mode which occurs in said optical waveguide, such that a minimum coupling loss result of said device is obtained.

3. The optical coupling device according to claim 1, wherein
   said first optical waveguide and said second optical waveguide are integrated into one of said two optical waveguide devices.

4. The optical coupling device according to claim 2, wherein
   said first optical waveguide and said second optical waveguide are integrated into one of said two optical waveguide devices.

5. An optical coupling method for optically coupling two optical waveguide devices differing in spot size of a light wave, comprising:
   joining the respective ends of two optical waveguides differing in waveguide width at said joined ends, and
   selectively setting the length of one of the optical waveguides to the length at which a light wave of a desired spot size can be obtained from interference between a radiation mode and a guided mode which occurs in said optical waveguide, such that a minimum coupling loss result of said device is obtained.

6. An optical coupling method for optically coupling two optical waveguide devices differing in spot size of a light wave, comprising:
   joining the respective ends of two optical waveguides differing in waveguide thickness at said joined ends, and
   selectively setting the length of one of the optical waveguides to the length at which a light wave of a desired spot size can be obtained from interference between a radiation mode and a guided mode which occurs in said optical waveguide, such that a minimum coupling loss result of said device is obtained.

7. The optical coupling method according to claim 5, further comprising:
   integrating said two optical waveguides into one of said optical waveguide devices.

8. The optical coupling method according to claim 6, further comprising:
   integrating said two optical waveguides into one of said optical waveguide devices.

9. The optical coupling device according to claim 1, wherein each of said first and second optical waveguides comprises a straight waveguide.

10. The optical coupling device according to claim 1, wherein said first optical waveguide and said second optical waveguide propagate a wave in a fundamental mode.

11. The optical coupling device to claim 1, wherein a width of said first optical waveguide is greater than a width of said second optical waveguide.

12. The optical coupling device according to claim 1, wherein a refractive index of said first optical waveguide and that of said second optical waveguide are substantially equal.

13. The optical coupling device according to claim 1, further comprising a substrate, said substrate supporting said first optical waveguide.

14. The optical coupling device according to claim 2, wherein each of said first and second optical waveguides comprises a straight waveguide.

15. The optical coupling device according to claim 2, wherein said first optical waveguide and said second optical waveguide propagate a wave in a fundamental mode.

16. The optical coupling device to claim 2, wherein a width of said first optical waveguide is greater than a width of said second optical waveguide.

17. The optical coupling device according to claim 2, wherein a refractive index of said first optical waveguide and that of said second optical waveguide are substantially equal.

18. The optical coupling device according to claim 2, further comprising a substrate, said substrate supporting said first optical waveguide.

19. The optical coupling device according to claim 1, wherein each of said first and second optical waveguides comprises a non-tapered waveguide.

20. The optical coupling device according to claim 2, wherein each of said first and second optical waveguides comprises a non-tapered waveguide.

* * * * *